Patented Nov. 4, 1947

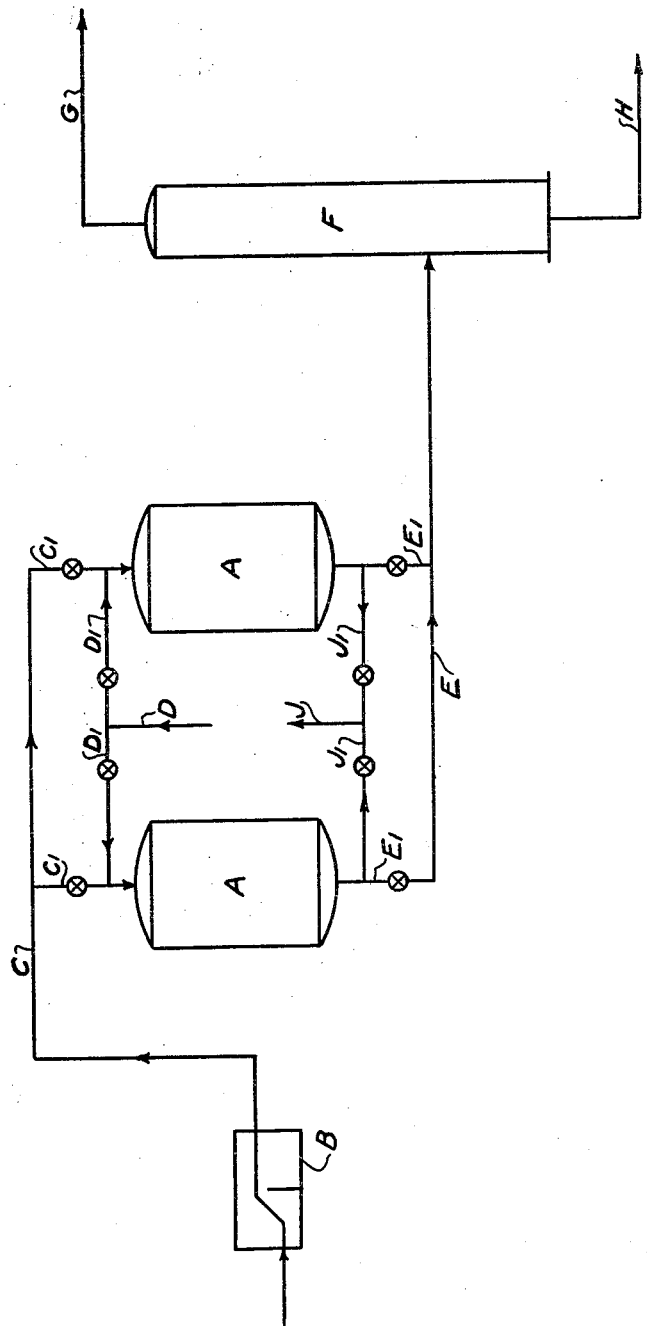

2,429,981

UNITED STATES PATENT OFFICE 2,429,981

CONVERSION OF HYDROCARBONS WITH ALKALI METAL-FREE CATALYST COMPRISING SILICA AND AMPHOTERIC OXIDE

John R. Bates, Swarthmore, Pa., assignor to Houdry Process Corporation, Wilmington, Del., a corporation of Delaware Application December 23, 1939, Serial No. 310,762

7 Claims. (Cl. 196—52)

The present invention is a continuation-in-part of my copending application Serial No. 170,648, filed October 23, 1937.

It relates to contact masses, their preparation and use. More particularly, it is concerned with contact masses having selected and controlled properties suitable for use in fluid contacting operations to exert catalytic influence over, enter into, or in any way assist chemical or physical changes in which the fluid participates. It has to do with catalysts derived from materials having zeolitic or base exchange properties and particularly those materials which are prepared by wet methods.

Artificial base exchange bodies prepared, for example, from soluble silicates and other compounds, amphoteric and otherwise, have found wide usage in the treatment of water or for other purposes wherein the base-exchanging capacity of the zeolite is utilized. Many such zeolites have high adsorptive capacity which renders them valuable starting materials for the production of catalysts. Catalysts prepared from these zeolites, however, have often failed to have the expected activity or the ability to retain it in use especially to promote organic reactions, which leave burnable deposit thereon necessitating periodic regeneration by combustion of said deposit, as for example, in effecting catalytic decomposition of hydrocarbons, to yield products of the gasoline type. Such processes utilizing these contact materials have failed, from a commercial standpoint, to be equal to or better than processes effected with the aid of cheaper and quite satisfactory catalysts comprising or consisting of suitably prepared naturally occurring or mineral substances, such as clays and other ores.

One object of the present invention is to provide synthetic catalysts for promoting hydrocarbon conversions characterized by high activity and high stability. Another object is to improve hydrocarbon conversion processes. Another object is to obtain high yields of gasoline having high anti-knock rating and high stability. Another object is to make products of selected chemical nature with low formation of catalyst deposit. Other objects will be apparent from the detailed description which follows.

According to the invention, economical processes for transforming hydrocarbons giving high yields of particularly valuable products result from the use, as catalysts, of plural component synthetic materials derived from base exchange oxides prepared by wet methods under controlled pH within the range of 3 to 11 and consisting essentially of the nuclear components of the base exchange body in substantially unchanged proportion and molecular relation. These catalysts may contain some alkali metal but its amount must not exceed 1% by weight of sodium oxide or its stoichiometric equivalent.

These catalysts are made by base exchanging with a solution containing a volatile or heat unstable cation, a zeolite prepared from ingredients containing in addition to nuclear components a predetermined and controlled amount of one or more suitable anions. The quantity of the selected anion controls both the pH of the zeolite forming reactions and the extent to which alkali metal may be removed by the base exchange step. Anions capable of forming weak or strong acids are suitable with the exception of those containing amphoteric elements. Common anions well suited for the purpose of the present invention include $Cl^-$, $SO_3^=$, $SO_4^=$, $CO_3^=$, $C_2H_3O_2^-$. The anion may be presented to the reacting ingredients of the zeolitic gel, coagulum, or precipitate as an acid and/or as a salt. In some instances, the anion is present in suitable amount in the reacting ingredients of the zeolite as, for example, in combination with a cation, the oxide of which enters into the nonexchangeable or nuclear portion of the zeolite. This is exemplified by certain zeolites prepared by interreaction of solutions of sodium silicate and certain aluminum salts, e. g., aluminum sulphate, ammonium alum, aluminum chloride, aluminum acetate. In some cases it is necessary to add an additional quantity of an anion in order to have the alkali metal present in removable form. In other cases, there may be no suitable anions in the original reactants whereupon all the anions may be added in a separate solution. Such is the case when, for example, solutions of sodium aluminate and sodium silicate comprise the starting materials for the preparation of a zeolite. The anion-containing compound may then be mixed with the soluble silicate or with the amphoterate, or, after the manner disclosed in my copending application, Serial No. 174,966, filed November 17, 1937, the anion-containing solution may be added to a mixture of solutions containing the nuclear elements of the zeolite and have the additional function of coagulating the same. When the anion is deliberately added as an extra ingredient to the zeolite forming material it is preferably in the form of a volatile or heat unstable compound, the cation of which is capable of practically complete removal by a simple physical treatment such as heating, such for example, as volatile inorganic salts including ammonium chloride, volatile organic salts such, for example, as methylamine hydrochloride, unstable salts such as ammonium sulfate, nitrate, and carbonate, or volatile or unstable acids including hydrochloric acid, formic acid and acetic acid. Ammonium sulphate is the preferred addition agent. When this compound is added to a sol, for example, to act as coagulating agent the finished catalyst has higher activity in hydrocarbon conversions than catalysts obtained from alkaline reactants and any of the other coagulating or addition agents given above.

When the reacting solutions, including the anion-containing material, for forming a zeolite containing sodium, for example, are so proportioned that the pH of the mixture is below about 11, the sodium content of the zeolite may be reduced to 1% or less and often below .75% by base exchange with the selected cation, even when the original sodium oxide content of the zeolite is as high as approximately 7 to 9%. In most instances, when the pH of the reacting ingredients is about 10 or below, the sodium oxide content is easily reduced to 0.5% or below, while pH values below 9 permit reduction of the sodium oxide content to about 0.2% at which point the accepted methods of analysis become inadequate for accurate determination. This is considered equivalent to virtual exhaustion of the undesirable component.

The actual removal of sodium or other metallic component or constituent is effected by treating the zeolite with a solution incapable of dissolving nuclear substances by acid reaction and containing the base exchanging cation. The latter must be of a volatile or decomposable nature and susceptible of substantially complete removal from the nuclear substances by the application of heat. The solute may be, and preferably is, a compound which is also of a volatile or heat decomposable nature, as for example, compounds of ammonium, of amines and of other organic bases. The operation is simple, comprising only contacting the zeolite one or any desired number of times with a solution of the selected compound and may be made at any time after precipitation or coagulation, but preferably after drying and/or washing. A good operation results from the use of a salt which is neutral or practically neutral. Ammonium chloride is one of the best compounds for such use.

In most instances, no more than six, and, usually, four or fewer, successive dips of the zeolite in the chosen base exchanging solution of proper concentration are necessary to remove the desired or required amount of the non-nuclear component or constituent. The operation is efficiently and economically conducted when each dip of the precipitate or coagulum is made in approximately one-half of its weight of a base exchanging solution comprising, for example, a 5% to 10% solution of ammonium chloride or a solution containing a stoichiometrically equivalent amount of the ammonium or another desirable volatile or unstable cation. Elevated or superatmospheric temperatures tend to increase the speed of the base-exchanging process. The quantities and concentrations of the base-exchanging solutions are not critical, and, as long as a sufficient amount of the desired cation is present satisfactory results are obtained with relatively larger amounts of more dilute and with relatively smaller amounts of more concentrated solutions. Likewise the number of dips required will usually vary inversely with the relative strength of the solution. Although successive dipping or batch treatment produces the desired result, for reasons of economy, in large scale treatment continuous countercurrent extraction to equivalent extent is utilized. Also, substantial economies in the quantity of base exchanging compound are realized when the precipitate or coagulum is washed free of excess quantities of the undesirable component or constituent and of other soluble substances, such as salts. Preferably, this washing is effected after drying the coagulum or precipitate and with suitably purified water which is free of the undesirable material.

The product resulting from the base exchanging step is a modified zeolite comprising the nucleus of the coagulum or precipitate substantially free of the base exchanging component or constituent originally held therein and zeolitically holding to the extent of its zeolitic capacity a base exchanged component or constituent susceptible of substantially complete removal by heat. The base exchanging step removes substantially none of the nuclear material. In no instance does the nucleus have associated therewith the original base exchanging material in an amount more than that equivalent to 1% by weight of sodium oxide and preferably contains below three-fourths or even one-half or less of that amount. It may contain as a zeolitic component or constituent, as much as approximately 5% by weight of the ammonium ion or radical or an equivalent amount of another volatile or heat unstable cation.

When the ultimate product is to be the original nucleus in substantially pure form, the modified zeolite is subjected to heat treatment to drive off its content of volatile or decomposable substance. For this purpose, the modified zeolite is simply heated to a temperature below that at which substantial depreciation of the desired catalytic properties of the nucleus takes place and is held at the selected temperature for a suitable and usually short period of time. When the modified zeolite comprises silica, alumina, and exchangeable ammonium, substantially all the ammonium is usually ejected when the zeolite is held at a temperature within the range of 700 to 1050° F. for a period of two hours or less. Higher temperatures may, however, be utilized, and it is characteristic of the catalysts embraced within the scope of the invention that they are exceptionally stable to heat, being capable of maintaining high activity for long commercial life involving frequent regenerations at combustion temperatures.

A predetermined and controlled amount of other material, including metals and metal oxides may be made a constituent or component of the finished catalyst. Such material may be inserted into the modified zeolite by base exchange in any desired quantity up to its full base exchange capacity. In order to make such contact masses, the modified zeolite, preferably in dried and washed form, is immersed one or more times in a solution containing cations of the desired metal or metal oxide in proper and regulated concentration. Accurate and rigid control over the amount of the additional material incorporated within the structure of the zeolite is attained through regulation of the strength of solution and of the number of immersions employed, the general tendencies being toward increased base exchange with higher concentrations and greater number of immersions. In this manner, any metallic element in the first to the eighth groups of the periodic table for example, Cu, Co, Ni, Fe, Mn, Cr, V, W, Li, Cs, Rb, Al, Ca, Sr, Ti, Mo, Mg, may become a constituent of the end product. Heat treatment of the modified zeolite following introduction thereinto of a metal constituent in zeolitic substitution for any desired portion of its content of volatile or decomposable material may thus produce a contact mass made up of the desired constituents or components in closely regulated proportionate amounts and substantially free of the original base exchanging component.

Gels prepared by coagulation of sols with a solution containing a volatile cation are of peculiar importance among the gelatinous materials suitable as starting materials for active and stable catalysts. These gels or coagulums are always alkaline when produced and are the only ones having pH values above about 8, as within the range of 9 to 11 which are susceptible of treatment to yield catalysts of optimum activity and stability. Full advantage in these respects is obtained from other gels, as exemplified by products obtained by interreaction of a soluble silicate and a salt of an amphoteric metal, or by coagulation with acid of a mixture or sol of the silicate and alkaline amphoteric solutions, when the gels are prepared at lower pH conditions, usually below 8 and preferably below 7, as within the range of 4 to about 7.

The invention is not limited to catalysts derived from two component nuclei. On the contrary, the stability, selective activity, or both, of synthetic catalysts may be further improved by inclusion of one or more additional selected components in the nucleus of the base exchange body. The presence of a desired and usually small quantity of thoria, beryllia, for example, intimately associated with silica and alumina in a base exchanging nucleus, or a difficultly reducible oxide of a metal of Group IV of the periodic table, improves the stability of the resulting catalyst for promoting production of gasolines and the like from naphthas and higher boiling hydrocarbons. The effect of additional nuclear components becomes pronounced when made a part of the nucleus under pH conditions of about 8 or below and preferably 7 or less. In addition to maintaining high activity after many months of commercial scale operaton involving as many as or more than 20 regenerations per day by burning of combustible deposit formed thereon, catalysts characteristic of the invention selectively promote formation of desired product with little tendency to form and accumulate contaminating deposit.

Over and above these advantages, which directly provide improved and more economical plant operation, these catalysts, despite being highly active in promoting splitting and kindred decomposition reactions, possess highly selective activity which direct the course of decomposition reactions toward products possessing a high degree of stability and marked anti-detonating characteristics. Motor fuels produced by their use under decomposition conditions, even without further purification, characteristically have high resistance to oxidation and other deteriorating influences encountered in storage and use, as measured, for example, by oxygen bomb induction periods, accelerated gum determinations, color stability tests, etc. In fact, these motor fuels are unique among those resulting from splitting and other decomposition reactions in that they possess the peculiar type of stability required of modern aviation gasolines and currently indicated by standardized acid heat or bromine number determinations. Utilizing a wide variety of charging stocks ranging from crude distillation residues to naphthas having boiling range characteristics of gasoline and including cracked and other naphthas of high acid heat, gasolines made according to the invention have acid heats of 60° F. and below and usually 40° F. or below.

The splitting reactions are preferably conducted in vapor phase. For most charging stocks catalyst temperatures within the range of 700 to 1050° F. are suitable, temperatures within the lower portions of the range, as up to 950° F. being usually employed for the transformation of high boiling hydrocarbons, and temperatures within the upper portion of the range, or 800° F. and higher, for kerosenes and other naphthas. It is preferable to employ comparatively low pressures, as from atmospheric up to 150 or 200 lbs. per sq. in. gauge. Pressures of about 30 lbs. per sq. in. gauge and up are of some advantage in transforming the more refractory naphthas and similar charging stocks, but it is preferred to use pressures below about 100 lbs. per sq. in. for transformation of higher boiling hydrocarbons such as gas oils and bottoms fractions. The feed rates for ordinarily liquid hydrocarbons usually lie within or above the range of 0.75 to 5 volumes of liquid charge to each volume of catalyst per hour, the tendency being toward higher rates for naphthas than for higher boiling stocks.

*Example 1*

A silica-alumina zeolite was prepared from a solution of sodium silicate comprising about 900 parts by weight of a commercial water glass having a specific gravity of approximately 1.4 and about 2500 parts by weight of water by mixing it with an equal volume of a solution containing about 320 parts by weight of commercial ammonium alum and approximately 2800 parts by weight of water. Within a short time a gelatinous precipitate formed. This precipitate having a pH of the order of 8 was then dried and washed with purified water until practically free of sulphates. Upon analysis the resulting solid was found to comprise about 84.3% $SiO_2$, 11.7% $Al_2O_3$, and 4% $Na_2O$ (anhydrous basis). It was then immersed for 30 minutes in one half its weight of a 10% solution of ammonium chloride maintained at a temperature of the order of 180° F., removed from the solution and washed with purified water. The immersion and succeeding washing steps were repeated three times and the resulting ammonium zeolite comprising the silica-alumina nucleus and approximately 2.3% by weight of the ammonium radical was divided into two portions.

One portion was heated to approximately 1050° F. and maintained at that temperature for about 2 hours, after which it was cooled and a sample subjected to chemical analysis. This material, found to consist of approximately 87.6% $SiO_2$, 12.1% $Al_2O_3$, and 0.3% $Na_2O$ (anhydrous basis), was used as catalyst in a continuous process for the transformation of Coastal gas oil having the approximate boiling range of 420° to 720° F. into 410° F. end point motor fuel involving repeated cycles of transformation periods of about 15 minutes duration alternating with regeneration periods when the coke like by-products of the transformation reaction were burned off at temperatures in the range of 800° F. to 1050° F. During the on-stream periods, the catalyst was maintained at about 810° F. while the charge was fed to it at substantially atmospheric pressure and at the rate of about 1.25:1 (volumes of charge, liquid basis, to each volume of catalyst per hour). The yield of the fractionated gasoline, which had an octane rating of about 78, copper dish gum of about 3 mg. per 100 cc., an oxygen bomb induction period of more than 10 hours, and an acid heat below 40° F., was found to be about 40% by volume of the charge. The coky deposit, averaging about 1.5% by weight of the catalysts, was substantially completely removed in 10 minute burning periods.

The second portion was treated to prepare contact mass of the type disclosed and claimed in U. S. Patent No. 2,078,951, issued to Eugene J. Houdry on May 4, 1937, and containing about 0.75% Mn. To this end, it was immersed for 30 minutes in about twice its weight of a solution containing approximately 0.85 mol of $MnSO_4$ per liter and maintained at a temperature of the order of 180° F. The resulting zeolite containing manganese was washed until practically free of sulphates, subjected to a heat treatment similar to that described for the first portion of the ammonium zeolite. A sample was analyzed for manganese content, which was found to be about 0.78%. This material was used in a hydrocarbon transforming operation similar to that described above and produced motor fuel of about the same quality and quantity. During such use it was regenerated rapidly and substantially completely at temperatures in the range of 900 to 1000° F.

Example 2

About 2500 parts by weight of a solution of sodium silicate having a specific gravity of about 1.4 was diluted with about 8200 parts by weight of water. This solution was mixed, in the weight ratio of 560 to 104 with a solution of sodium aluminate of approximately half the strength of that employed in that example. To this mixture there was added about 60 parts by weight of concentrated hydrochloric acid, immediately after which addition a gel was formed. This gel, which had a pH of about 4, after being dried and washed free of chlorides was found to contain about 2% by weight of sodium oxide. This zeolite was then given three dips in 5% ammonium chloride solution and a subsequent heat treatment at about 1000° F. for about 2 hours. The resulting product was highly porous and was an active catalyst in the production of high anti-knock motor fuels from higher boiling hydrocarbons, or from naphthas of lower anti-knock rating. The composition of this product was determined by chemical analysis and compared with the analysis of the dried and washed gel. The base exchanged product was thus found to be, within the limits of experimental error, of the same composition as the nucleus of the gel and contained, in addition, approximately only 0.2% of sodium oxide.

Example 3

A solution of commercial sodium silicate containing about 11.8 mols of silica was mixed with a solution of commercial sodium aluminate containing approximately 1 mol of alumina to form a sol, the solutions being of such concentration as to be capable of yielding an all-embracing gel. To this sol, before precipitation or gellation coagulation had taken place therein, there was added a solution of ammonium sulphate in an amount about stoichiometrically equivalent to that sodium oxide content of the sol. The coagulum of about 9.6 pH which was then formed was dried at about 200° F. and washed practically free of sulphate. It was then treated with a solution of ammonium chloride until its residual sodium content had been reduced to approximately 0.2%. The resulting ammonium zeolite was then washed free of chloride, dried and given an activity adjustment treatment in accordance with my copending application Serial No. 289,915, filed August 12, 1939, by subjecting at temperature of about 1400° F. for 10 hours in an atmosphere comprising 95% air and 5% steam to yield a finished catalyst consisting essentially of substantially pure silica and alumina.

A portion of this catalyst was utilized to transform a naphtha obtained from a Coastal crude having a boiling range of about 154–464° F. and an octane rating of about 57. In this operation the naphtha was fed to the catalyst at a rate of about 2.25:1, (volumes of charge, liquid basis, to each volume of catalyst per hour) under pressure of the order of 50 lbs. per sq. in. gauge for an operating period of about 10 minutes while maintaining the catalyst at a temperature of about 860° F. A portion of the products issuing from the catalyst was fractionated and condensed to yield motor gasoline of about 400° F. end point.

This motor gasoline, upon test, had Saybolt color of 30, accelerated gum, Navy method, of 0.8 mg., oxygen bomb induction period of more than 10 hours, sulphur content of 0.01%, and octane, C. F. R. motor method, of 76. Addition of 3 cc. tetraethyl lead to a gallon of this gasoline raised its octane to about 89. The yield of the above described gasoline was about 82% by volume of the charging stock. A clean higher boiling fraction valuable for use as domestic distillate fuel or as light gas oil comprising about 9% by volume of the charge and having a boiling range of approximately 410–694° F. was simultaneously produced. The coke-like deposit which remained on the catalyst was about 6 grams per liter of catalyst and equivalent to less than 1% of its weight.

Another portion of the products leaving the catalyst was fractionated to yield an aviation gasoline of about 96 to 322° F. boiling range. This product had substantially the same oxygen bomb stability and low sulphur and gum content of the above described motor gasoline, an octane of approximately 78 which was easily raised to about 91 by the addition of 3 cc. of tetraethyl lead per gallon. In addition, this product had an acid heat substantially below 15° F. The yield of this aviation fuel was about 62% by volume of the charging stock.

Another portion of this catalyst was utilized to promote transformation of a gas oil obtained from Coastal crude and having an A. P. I. gravity of about 30° and a boiling range of about 420–735° F. This charge stock was fed to the catalyst at the rate of about 1:1 (volumes of charge, liquid basis, to each volume of catalyst per hour), under pressure of the order of 7 lbs. per sq. in. gauge for an operation period of about 10 minutes during which the catalyst was maintained at approximately 790° F. Fractionation of the vapors issuing from the catalyst yielded a motor gasoline of approximately 410° F. end point having a Saybolt color of 30, a copper dish gum of 3, an oxygen bomb induction period of more than 10 hours, sulphur content of 0.01% and an octane rating of 80+ (C. F. R. M. M.). The yield of this gasoline was somewhat more than 55% by volume of the charge. There was produced with it high boiling material with an end point of approximately 720° F. which was clean and suitable for use as clean distillate domestic fuels or as light gas oil. It amounted to about 35% by volume of the fresh charge. Accumulated on the contact mass was coke-like deposit amounting to less than 9 grams per liter of catalyst and equivalent to about 1.4% of its weight.

The small quantity of deposit remaining on the catalyst in each of the above operations was easily removed by combustion at temperatures not exceeding 1050° F. in burning periods of about 10 minutes' duration.

*Example 4*

A substantially pure silica-alumina catalyst made substantially as disclosed in Example 3 was utilizer to reform a straight run naphtha from West Texas crude, having a boiling range of about 110 to 414° F., sulphur content of approximately 0.17%, octane rating of about 51 (C. F. R. M. M.) which was raised only to about 54 upon the addition of 1 cc. of tetraethyl lead per gallon. This charge stock was fed to the catalyst at a rate of the order of 1:1 (volumes of charge, liquid basis, to each volume of catalyst per hour), under pressure of approximately 50 lbs. per sq. in. gauge and temperature in the neighborhood of 810° F. for an operating period of 10 minutes. Upon fractionation of the transformed vapors, condensation of the overhead and separation of fixed gas therefrom, condensed gasoline having an end point of about 390° F. and amounting to approximately 90% of the volume of the charge was obtained. This product had a Saybolt color of about 30, copper dish gum of about 2 mg., oxygen bomb induction period of more than 10 hours and sulphur content of approximately 0.01%. Its octane rating, determined by the C. F. R. Motor method, was approximately 70 and was raised to about 80 by the addition of 1 cc. of tetraethyl lead per gallon. The extreme stability of this product is further emphasized by the fact that it had an acid heat of less than 10° F. The coke deposit on the catalyst during this operation was equivalent to less than 0.3% by weight of the catalyst or less than 2 grams per liter of catalyst.

*Example 5*

A gel containing silica and alumina in the molar ration of approximately 17:1 was prepared by mixing a solution of commercial sodium silicate with a solution of commercial aluminum sulfate and sufficient concentrated sulfuric acid to yield a gel having a pH value of the order of 6. After filtering, it was treated with ammonium chloride solution until its content of alkali metal was reduced to below 0.5% by weight of sodium oxide. After again washing, this material was heat treated at about 1050° F. for about 2 hours. The finished catalyst was then utilized to promote transformation of an East Texas gas oil having a boiling range of 420 to 720° F. This gas oil was fed in vapor form to the catalyst at a rate of about 1.5:1 (volumes of charge, liquid basis, to each volume of catalyst per hour) for an operating period of approximately 10 minutes while maintaining the catalyst at about 785° F. Upon fractionation, the products of this operation were found to contain a quantity of 400° F. end point gasoline equivalent to about 50% by volume of the charging stock. This gasoline had an octane rating of about 80 (C. F. R. Motor method), acid heat of about 40° F., copper dish gum substantially below 10 mg. and an oxygen induction period over 10 hours. A portion of the catalyst was analyzed and the burnable deposit on it found to be approximately 1.8% by weight or about 12½ grams per liter. This deposit was substantially completely removed in a burning period of about 10 minutes, during which time the maximum catalyst temperature was maintained below 1100° F.

*Example 6*

A three component base exchange body containing silica, zirconia and alumina in the approximate molar ratio of 15:0.9:1 was prepared as follows. About 22.5 kilograms of a solution of commercial sodium silicate was mixed with approximately 3.5 liters of ammonium hydroxide solution having a specific gravity of 0.9. To this mixture there was added a second solution made up of approximately 3.5 kilograms of commercial aluminum sulfate mixed with about 2 kilograms of zirconium sulfate. Within a minute an all embracing gel having a pH value of about 5.7 set up. This gel was dried, washed and treated with an ammonium chloride solution until the total sodium oxide content was reduced to below 0.5%. This product was divided into two portions.

One portion was heat treated at about 1050° F. for two hours and was utilized to promote gasoline formation from the same gas oil used in Example 5 and under substantially the same reaction conditions. The fractionated 400° F. end point gasoline obtained from the reaction products was found to amount to approximately 52% by volume of the gas oil charge. Upon analysis, the coke-like deposit on the catalyst was found to be less than 1.9% by weight or approximately 13 grams per liter and was removed within a 10 minute burning period conducted at maximum temperature of 1100° F. Upon extensive use this catalyst maintained its ability to form high yields of gasoline product, but its tendency to accumulate coky deposit decreased.

The other portion of this catalyst was subjected to heat treatment at about 1400° F. for 2 hours. When used in a process for producing 400° F. end point gasoline utilizing the same charging stock and substantially the same operating conditions as for the first portion of the catalyst, it was found that substantially the same quantity of gasoline product was obtained. The catalyst deposit, however, was found to be approximately 1% by weight or about 7 grams per liter.

The gasoline recovered in both the above runs had octane ratings in excess of 76 (C. F. R. Motor method). Each gasoline had an acid heat value below 60° F. along with low copper dish gums and long oxygen bomb induction periods.

A typical illustration of the effectiveness of this catalyst in promoting transformation of low octane napthas into high octane product is as follows. A heavy naphtha having a boiling range of the order of 280 to 450° F. and an octane rating of about 35 and obtained from East Texas crude was fed to the second portion of the catalyst at the rate of about 1.25:1 (volumes of charge, liquid basis, to each volume of catalyst per hour) under pressure of the order of 50 lbs. per sq. in gauge for a run of 20 minutes duration during which the catalyst was maintained at about a temperature of 820° F. The 400° F. end point gasoline separated by fractionation and condensation from the vapors issuing from the reaction zone was found to be equivalent to about 60% by volume of the fresh charge. Upon analysis, this gasoline had an octane rating of about 70 and the color and stability characteristics typically result from practice of the invention. The coky deposit on the catalyst was of the order of 0.8% of its weight or about 5.5 grams per liter. This deposit was easily removable in a 10 minute burning period.

*Example 7*

A multi-component synthetic catalyst containing silica, alumina and beryllia in the approximate molar ratio of 17:1:0.5 was prepared in the following manner. A solution containing 70 parts by weight of beryllium sulfate, about 250 parts by weight of aluminum sulfate and of the order of 40 parts of concentrated sulfuric acid was mixed with a solution containing about 1450 parts by weight of commercial sodium silicate. The resulting gel, having a pH of the order of 5, was dried, washed and treated with ammonium chloride solution until its total sodium oxide content was reduced to below 0.5% by weight. The treated material, after washing and heat treatment at temperature of the order of 1050° F. for 2 hours, was utilized to promote transformation into antiknock motor fuel of the same gas oil that was employed in Examples 5 and 6, the conditions of run being substantially the same as described in those examples. The fractionated 400° F. end point gasoline resulting from this operation was found to amount to about 42% by volume of the gas oil charge and had an octane rating in excess of 75 (C. F. R. Motor method) along with the high stability, including acid heat below 60° F., which characteristically results from use of the invention. The coky deposit on the catalyst amounted to approximately .8% of it by weight or of the order of 5.5 grams per liter and was easily removed in a burning period at least as short as the on-stream or run period.

*Example 8*

An active heat stable and regenerative catalyst consisting essentially of substantially pure silica, zirconia and beryllia in the approximate molar ratio of 15:1:0.9 was prepared. To obtain this material an ammoniacal solution containing approximately 1700 parts by weight of commercial sodium silicate was mixed with a solution containing about 270 parts by weight of zirconium sulfate and 98 parts by weight of beryllium sulfate and of the order of 120 parts by weight of ammonium sulfate. In about half a minute an opalescent gel, having a pH value of the order of 6.4, was formed. This gel was filtered, dried, washed and treated with a solution of ammonium chloride until its total sodium oxide content was reduced to below 0.5% by weight. After again washing, this material was heat treated for about 2 hours at controlled temperature of the order of 1100° F. and was then utilized under substantially the same operating conditions to promote transformation of the same gas oil employed in Examples 5, 6 and 7. The yield of 400° F. end point gasoline was approximately 40% by volume of the fresh charge. This gasoline had the highly desirable characteristics including high octane rating in excess of 70 (C. F. R. Motor method) and the high degree of stability including long oxygen bomb induction periods and low acid heat which characteristically result from practice of the invention. The coky deposit remaining on the catalyst was less than 0.8% of it by weight or approximately 4.5 grams per liter and was easily removed in a 10 minute burning period conducted at low temperatures regulated not to exceed 1050° F.

Each of the catalysts described in the foregoing examples maintained high selective activity in promoting formation of stable and anti-knock motor fuels for long periods of continuous use under commercial operating conditions.

Although each of these catalysts contained silica, the invention is not limited solely to silicious materials. Other combinations of intimately associated oxides which have high activity and high stability in the production of high anti-knock motor fuels by splitting reactions include nuclei of base exchange material comprising intimately associated combinations of zirconia and alumina, zirconia and beryllia, beryllia and alumina, thoria and alumina, etc., prepared by coprecipitation or other reaction conducted in the wet under controlled pH conditions, preferably not in excess of about 8. From the viewpoint of cost of the catalyst, however, it is preferable to use silicious materials, and, in some instances, the presence of silica in the nucleus appears to favorably affect both the activity and stability characteristics of the catalyst. The preferred silicious catalysts are those in which the silica predominates, at least 4 mols of silica, for example, being present in the nucleus for each mol of other nuclear oxide. Very high stability and activity are obtained when at least 10, say 10 to 25 mols of silica are present for each mol of any other one oxidic constituent of the nucleus.

In order to facilitate regeneration it is preferable that the catalyst be presented to the reactants in the form of grains or shaped pieces of substantially uniform size and shape. To this end, the catalytic gel may be molded into cylinders, pellets or any other desirable shape at any desired stage of their manufacture or treatment. In the interest of utilizing, unimpaired, the activity and stability of the synthetic catalytic product it is preferred that the molding operation be conducted without the aid of extraneous binding materials containing or comprising sodium or other alkali metal. One molding method which avoids the use of extraneous binders is that disclosed in United States Patent No. 2,146,718 to George R. Bond, Jr., dated February 14, 1939.

The high anti-knock rating, stability and other value properties of products of the invention are probably due to the fact that the selective catalysis promotes formation of stable branch chain paraffins to the exclusion, or substantially so, of reactions which terminate with the formation of olefines or which convert straight chains to ring compounds. The products, whether derived from naphthenic or paraffinic base starting materials are predominantly paraffinic with the branched chain paraffins preponderating, often in molar ratios as high as or higher than 4:1 over the straight chain compounds; in fact, their content of branch chain paraffins usually exceeds their content of any other type of hydrocarbon, and, in some instances, exceeds the total quantity of all other types of hydrocarbons found in the products. Their content of olefines is generally below 10 mol percent, and in many cases is as low as 2 to 4%.

In the aliphatic hydrocarbons normally occurring in gasoline, say those having from 5 to 12 carbon atoms, there are about 650 possible paraffins as against over 3800 olefins. Therefore, the fact that but a very limited quantity of olefins is formed limits to a greatly reduced number the components of gasoline made according to the invention. The resulting mixture of hydrocarbons is comparatively simple, particularly in portions of the gasoline boiling below about 212° F. and becomes even simpler in the portions boiling at or below 160° F. This simplicity of composition makes possible the separation by fractionation from products of the invention of selected material having valuable properties. For example, the hydrocarbon iso-pentane (2-methyl-butane) boiling at 80° F. is the only paraffin component in the gasoline boiling between 40° and 95° F. and can easily be segregated in substantially pure form in a fraction containing such a small quantity of olefines (less than 5%) that the latter can easily be removed, as by acid treatment, with no more than slight loss. Neo hexane (2,2 dimethyl butane) having an octane rating of 94 (C. F. R. Motor method) and having a lead susceptibility superior to iso-octane is another stable hydrocarbon that may be separated in a fraction containing minor quantities, if any, of substances which detract from its desired properties as motor fuel or as an addition or blending agent to produce premium quality and especially aviation fuels. The paraffins boiling nearest this compound, whose boiling point is 122° F., are normal pentane, boiling at 97° F., having an octane rating of 64, and 2,3 dimethyl butane boiling at 136° F. having an octane of 95, and 2 methyl pentane, whose boiling point is 60° C. and octane rating 73. Hence, it is relatively simple to obtain a stable fraction containing one or more highly knock resistant hydrocarbons for addition material in preparing fuels having octane ratings of 90 or above. The preponderance of iso-paraffins over all other types of aliphatic hydrocarbons provides for commercially attractive yields of selected fractions containing the above described hydrocarbons or other desired iso-paraffins.

When the charging stock contains refractory sulphur components, such components are converted into easily removable form, the resulting stable motor fuel often being capable of meeting market specifications for sulphur content and of passing accepted corrosion tests without being subjected to further purification, except possibly a suitable treatment to remove traces of hydrogen sulphide, for example, a light caustic wash. In addition, when the charge subjected to the selective splitting action of the catalyst is a naphtha, the resulting product having low acid heat and improved octane rating is more responsive than the charge to addition agents such as tetraethyl lead.

The accompanying drawing shows a schematic flow diagram of one type of operation that may be employed in practicing the invention. In order to provide continuous flow of reactants to and of reaction products from a plant, a plurality or battery of converters of any suitable type, as indicated, for example, at A in the accompanying drawing, is preferably employed; each utilized alternately on stream and in regeneration and operated in coordination or in cycle so that the stream of reactants preheated in a suitable heater B and supplied to the battery by line C selectively connected to converters A by valved branches $C_1$ may be transferred from one converter at the end of an operating period therein to another converter which has completed the regeneration phase of the alternating operation. The products of conversion discharging into line E by the proper valved branch $E_1$ may be subjected to fractionation in fractionator F to provide a distillate, gasoline, for example, withdrawn by line G and a higher boiling fraction which flows through withdrawal line H. Desired converter temperatures during either or both of the onstream and regeneration phases of the cycle may be maintained with the aid of an extraneous heat exchange medium, for example after the manner disclosed in U. S. Patent 2,078,947, issued May 4, 1937, to E. J. Houdry et al., in the copending application of E. J. Houdry and T. B. Prickett, Serial No. 261,728, filed March 14, 1939 (now U. S. Patent 2,283,208, of May 19, 1942), or in my copending application Serial No. 308,193, filed December 8, 1939 (now U. S. Patent 2,273,826 of February 24, 1942). By preference, the regenerating medium, supplied to the battery by line D and valved branches $D_1$, is maintained under superatmospheric pressure which may be up to say 150 lbs. per sq. in gauge, for example, after the manner set forth in U. S. Patent 2,167,698, issued to R. S. Vose on August 1, 1939, or in U. S. Patent 2,167,655, issued to E. J. Houdry et al. on the same date. Spent regenerating medium issues from the converters into discharge line J by way of valved branches $J_1$. As indicated by the specific examples, the low formation of deposit promoted by the synthetic catalysts provides for short burning periods.

I claim as my invention:

1. In the catalytic transformation of hydrocarbons to yield decomposition products, the process of subjecting hydrocarbon charging stock at reaction temperature to the action of a substantially pure synthetic blend of silica and alumina, obtained by base exchanging a dry silica-alumina zeolite produced by drying hydrous coprecipitate of silica and alumina containing alkali metal with a solution of a salt selected from the group ammonium salts and amino salts until the alkali metal content of said zeolite is practically completely removed followed by introduction of a non-volatile cation into said zeolite by base exchange and by heat treatment of the base exchanged zeolite at high temperature to drive off residual ammonium or amino cation.

2. In the transformation of hydrocarbon fractions containing components higher boiling than gasoline to yield products of the gasoline type, the steps of feeding such as hydrocarbon fraction under conditions suitable for effecting splitting reactions over a synthetic catalyst prepared from a synthetic base exchange body containing silica and an amphoteric oxide as nuclear components and precipitated under controlled pH conditions within the range of 8 to 11 by coagulation of a mixture of solutions of a soluble silicate and an alkali metal amphoterate with a coagulating solution containing ammonium sulfate, said catalyst consisting essentially of said nuclear components substantially free of alkali metal originally associated therewith.

3. In promoting hydrocarbon reactions, the process of preparing a zeolite from reactant solutions containing silica, an amphoteric metal and an anion formed from a non-amphoteric element so proportioned that the resulting gel has a pH value below 11, drying said gel to produce a dried zeolite, treating the latter with a solution of a salt containing a volatile or decomposable cation until substantially all the alkali metal content of the zeolite is removed, introducing a predetermined and controlled amount of an active metal into the treated zeolite by base exchanging a portion only of the substituted volatile or unstable cation for said active metal, subjecting the resulting base exchanged zeolite to heat treatment at temperature in excess of 700° F. to drive off substantially all the remaining volatile or unstable cation, and thereafter feeding to said zeolite in washed condition and heated to decomposition temperature higher boiling hydrocarbons to convert the latter into lower boiling decomposition products.

4. The process of transforming naphthas to produce a stable motor fuel of improved antiknock rating comprising the step of contacting the naphtha charge under dehydrogenation conditions with a catalyst consisting essentially of substantially pure and calcined nuclear material derived from a precipitated silica-alumina zeolite by drying the precipitated zeolite and subsequently removing substantially all non-nuclear components from the dried zeolite.

5. The process of producing gasoline from ordinarily liquid hydrocarbon charge comprising contacting such a hydrocarbon charging stock under cracking conditions with a contact mass consisting essentially of silica and alumina prepared by drying a hydrous composite of silica, alumina and alkali metal oxide, substituting a cation selected from the group consisting of ammonium and amines for substantially all of said alkali metal oxide in said dried composite, and subsequently calcining the composite to drive off said cation.

6. In the transformation of hydrocarbon fractions containing components higher boiling than gasoline to yield products of the gasoline type, the steps of feeding such a hydrocarbon fraction under conditions suitable for effecting splitting reactions over a synthetic catalyst prepared from a synthetic base exchange body containing silica and an amphoteric oxide as nuclear components and precipitated under controlled pH conditions within the range of 8 to 11 by coagulation of a mixture of solutions of a soluble silicate and an alkali metal amphoterate with a coagulating solution containing a salt of a weak base which reacts with the alkali metal content of said mixture to form a weak base and a salt, said catalyst consisting essentially of said nuclear components substantially free of alkali metal originally associated therewith.

7. The hydrocarbon conversion process for the production of normally liquid, low boiling hydrocarbons, which comprises introducing a hydrocarbon charge stock in vapor phase under cracking conditions into contact with a catalyst containing a coprecipitate consisting essentially of silica and alumina which has been substantially freed of base exchangeably held material by base exchanging ammonium ion for base exchangeably held material and by calcination to free the coprecipitate of ammonia, said base exchange being effected in the dried state of the composite.

JOHN R. BATES.

REFERENCES CITED

The following references are of record in the file of this patent:

UNITED STATES PATENTS

| Number | Name | Date |
|---|---|---|
| 1,728,732 | Jaeger | Sept. 17, 1929 |
| 1,782,353 | Jaeger et al. | Nov. 18, 1930 |
| 1,840,450 | Jaeger et al. | Jan. 12, 1932 |
| 1,935,176 | Connolly | Nov. 14, 1933 |
| 2,137,492 | Hyman | Nov. 22, 1938 |
| 2,124,583 | Morrell | July 26, 1938 |
| 2,154,820 | Ocon | Apr. 19, 1939 |
| 2,212,035 | Morrell et al. | Aug. 20, 1940 |
| 2,214,455 | Egloff et al. | Sept. 10, 1940 |
| 2,229,353 | Thomas et al. | Jan. 21, 1941 |
| 2,141,185 | Houdry | Dec. 27, 1938 |
| 2,146,718 | Bond, Jr. | Feb. 14, 1939 |
| 2,197,007 | Pew, Jr. | Apr. 16, 1940 |
| 2,206,921 | Schulze | July 9, 1940 |

FOREIGN PATENTS

| Number | Country | Date |
|---|---|---|
| 270,314 | Great Britain | May 2, 1928 |
| 270,704 | Great Britain | July 30, 1928 |
| 484,368 | Great Britain | May 4, 1938 |
| 504,614 | Great Britain | Apr. 24, 1939 |
| 515,309 | Great Britain | Dec. 1, 1939 |
| 820,917 | France | Aug. 9, 1937 |